US012684052B2

(12) United States Patent
Evans

(10) Patent No.: US 12,684,052 B2
(45) Date of Patent: Jul. 14, 2026

(54) METHOD AND DEVICE FOR UNIDIRECTIONAL DATA TRANSFER

(71) Applicant: PA KNOWLEDGE LIMITED, London (GB)

(72) Inventor: Duncan Bruce Evans, Cambridgeshire (GB)

(73) Assignee: PA KNOWLEDGE LIMITED, London (GB)

( * ) Notice: Subject to any disclaimer, the term of this patent is extended or adjusted under 35 U.S.C. 154(b) by 311 days.

(21) Appl. No.: 18/692,572

(22) PCT Filed: Sep. 16, 2022

(86) PCT No.: PCT/GB2022/052350
§ 371 (c)(1),
(2) Date: Mar. 15, 2024

(87) PCT Pub. No.: WO2023/041923
PCT Pub. Date: Mar. 23, 2023

(65) Prior Publication Data
US 2024/0406293 A1     Dec. 5, 2024

(30) Foreign Application Priority Data

Sep. 17, 2021   (GB) ...................................... 2113324

(51) Int. Cl.
*H04L 69/22* (2022.01)

(52) U.S. Cl.
CPC .......... *H04L 69/22* (2013.01); *H04L 2212/00* (2013.01)

(58) Field of Classification Search
CPC . H04L 69/22; H04L 2212/00; H04L 63/0209;
H04L 63/0236; H04L 63/0245; H04L
9/40; H04L 63/107; H04L 63/18; H04L
65/1013; G06F 21/606; G06F 21/60
USPC ................................. 370/474; 455/410–414.1
See application file for complete search history.

(56) References Cited

U.S. PATENT DOCUMENTS

| | | | | |
|---|---|---|---|---|
| 7,035,212 | B1 * | 4/2006 | Mittal | H04L 45/60 |
| | | | | 370/413 |
| 2008/0225853 | A1 * | 9/2008 | Melman | H04L 45/08 |
| | | | | 370/392 |
| 2014/0208433 | A1 | 7/2014 | Mraz et al. | |

(Continued)

FOREIGN PATENT DOCUMENTS

EP          3506587 A1      7/2019

*Primary Examiner* — Michael Y Mapa
(74) *Attorney, Agent, or Firm* — Harness, Dickey & Pierce, P.L.C.

(57) ABSTRACT

According to an aspect of the disclosure there is provided a method of data transfer, comprising: receiving data at an ingress interface of a device, the received data comprising pay load data and ingress destination data, assigning received data to one of a plurality of logical data streams based on the ingress destination data, the device removing the ingress destination data associated with the payload data and adding egress destination data to the payload data, for each logical data stream, wherein egress destination data added depends on the logical data stream, outputting data at an egress interface of the device, the output data comprising the pay load data and the egress destination data, wherein data flow between the ingress interface and the egress interface of the device is unidirectional.

20 Claims, 1 Drawing Sheet

(56) References Cited

U.S. PATENT DOCUMENTS

2019/0014092 A1 * 1/2019 Malek ................. H04L 63/1433
2020/0099658 A1     3/2020 Couillard et al.

\* cited by examiner

1

5

4-1

4-2

4-3

4-N-1

4-N

2

3

6

7

METHOD AND DEVICE FOR UNIDIRECTIONAL DATA TRANSFER

CROSS REFERENCE TO RELATED APPLICATIONS

This application is a U.S. National Phase Application under 35 U.S.C. 371 of International Application No. PCT/GB2022/052350, filed on Sep. 16, 2022, which claims priority to United Kingdom Application No. 2113324.4, filed on Sep. 17, 2021. The entire disclosure of each application is expressly incorporated by reference herein.

TECHNICAL FIELD

The present disclosure relates to a method of unidirectional data transfer, and a device for unidirectional data transfer.

BACKGROUND ART

Unidirectional network devices, such as data diodes, allow network data to travel in only one direction. Data diodes may be used in high security environments, such as defence, to provide connections between two or more networks of differing security classifications.

Data diodes have primarily been designed as file-based devices that implement one-way transfer. These devices align well with some use-cases-particularly bulk import of data—but are less well suited to streaming applications and applications where syntactic checking is not required.

Existing data diodes offer a simple, assured one-way transfer function. However, as a layer-2 (data link) device it is difficult to integrate into networks. Existing data diodes offer limited security enforcing functions beyond one-way transfer.

It is an aim of the present disclosure to at least partially address some of the issues identified above.

SUMMARY OF THE INVENTION

According to an aspect of the disclosure there is provided a method of data transfer, comprising: receiving data at an ingress interface of a device, the received data comprising payload data and ingress destination data, assigning received data to one of a plurality of logical data streams based on the ingress destination data, the device removing the ingress destination data associated with the payload data and adding egress destination data to the payload data, for each logical data stream, wherein egress destination data added depends on the logical data stream, outputting data at an egress interface of the device, the output data comprising the payload data and the egress destination data, wherein data flow between the ingress interface and the egress interface of the device is unidirectional.

Optionally, the assigning received data to one of a plurality of logical data streams based on the ingress destination data comprises adding a unique stream identifier to the received data.

Optionally, the correspondence between the ingress destination data and the logical data streams is configurable by a user.

Optionally, the correspondence between the logical data streams and the egress destination data is configurable by a user.

Optionally, ingress destination data that is valid and therefore assigned to a logical data stream is configurable by a user.

Optionally, the ingress destination data identifies an ingress logical port.

Optionally, the ingress destination data identifies the device.

Optionally, the egress destination data identifies a destination system.

Optionally, the egress destination data identifies a destination logical port.

Optionally, the user is able to configure the device via a management interface of the device distinct from the ingress interface and the egress interface.

Optionally, the device performs at least one further security function on each data stream before outputting the data at the egress interface.

Optionally, the at least one further security function is one or more of: syntactic checking, data rate limits or alarms, payload size limits, source MAC/IP/UDP port filtering, filtering based on data frame type, payload signature verification.

Optionally, the ingress interface is implemented by a first processing unit and the egress interface is implemented by a second processing unit. Optionally, the assigning of received data to a logical data stream is performed by the first processing unit. Optionally, wherein the removal of the ingress destination data is performed by the first processing unit, the second processing unit or at least one further processing unit between the first and second processing units. Optionally, the adding of the egress destination data is performed by the second processing unit. Optionally, the at least one further security function is performed by a processing unit which does not implement the ingress or egress interfaces.

Optionally, the unidirectional data flow is implemented by a one way electrical connection within the device.

Optionally, the input and output data is UDP data.

According to a second aspect of the disclosure there is provided a device for unidirectional data transfer, comprising: an ingress interface for receiving data, the received data comprising payload data and ingress destination data, an egress interface for outputting data, the output data comprising the payload data and egress destination data, wherein the device is configured to: assign the received data to one of a plurality of logical data streams based on the ingress destination data, remove the ingress destination data associated with the payload data and add the egress destination data to the payload data, for each logical data stream, wherein egress destination data added depends on the logical data stream, and allow data to flow between the ingress interface and the egress interface only from the ingress interface to the egress interface.

According to a third aspect of the disclosure there is provided a network comprising at least one device according to the second aspect.

BRIEF DESCRIPTION OF THE DRAWINGS

Further features of the invention are described below, by way of non-limiting examples, and with reference to the accompanying drawings, in which.

DETAILED DESCRIPTION

Figures 1, 2:
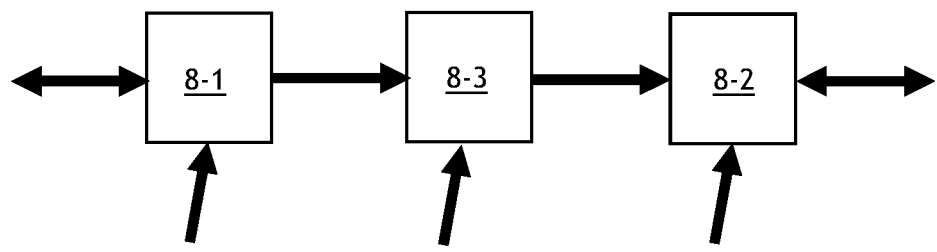
FIG. 1 schematically shows a logical block diagram of a device for unidirectional data transfer.
FIG. 2 schematically shows an example hardware implementation of the device of FIG. 1.

FIG. 1 schematically shows a logical block diagram of a device 1 for unidirectional data transfer. Devices for unidirectional data transfer are often referred to as data diodes.

As shown, the device 1 comprises an ingress network interface 2. The ingress network interface 2 is configured to receive data from sources external to the device 1. The device further comprises an egress network interface 3. The egress network interface 3 is configured to output data to destinations external to the device 1. The ingress and egress network interfaces 2, 4 may be wired (e.g. LAN) or wireless (e.g. WLAN) interfaces.

The device 1 assigns received data to one of a plurality of logical data streams 4-1 to 4-N that are processed between the ingress network interface 2 and the egress network interface 3, e.g. by a security function performing part 5. As shown by the arrows, data assigned to a logical data stream 4-1 to 4-N may only traverse the device in one direction from the ingress interface 2 to the egress interface 2, but not from the egress interface 3 to the ingress interface 2.

As shown, the ingress network interface 2 may also output some data. However, such data cannot traverse the device 1 between the ingress interface 2 and the egress interface 3. As shown, the data output by the ingress network interface 2 may be generated by an ingress network function performing part 6. The ingress network function performing part 6 may perform network functions such as ARP, DCHP and NTP. The ingress network interface 2 may have a single IP address, e.g. allocated either statically or dynamically via DHCP.

As shown, the egress network interface 3 may also receive some data. However, such data cannot traverse the device 1 between the ingress interface 2 and the egress interface 3. As shown, the data output by the egress network interface 3 may be generated by an egress network function performing part 7. The egress network function performing part 6 may perform network functions such as ARP, DCHP and NTP. The egress network interface 3 may have a single IP address, e.g. allocated either statically or dynamically via DHCP.

The received data comprises payload data and ingress destination data. The payload data is data intended to traverse the device 1 and be delivered to a destination on the egress side of the device 1. The ingress destination data is data identifying (e.g. indirectly, as described further below) the intended destination of the received data. The received data is assigned to one of the plurality of logical data streams 4-1 to 4-N based on the ingress destination data. Received data may be assigned to one of the plurality of data streams 4-1 to 4-N by the addition of a unique stream identifier for each data stream 4-1 to 4-N.

Each of the logical data streams 4-1 to 4-N may be associated with specific ingress destination data. There may be a finite number of logical data streams 4-1 to 4-N, but there may be a greater number of possibilities for the ingress destination data. Only data comprising valid ingress destination data (i.e. destination data associated with a logical data stream) may be assigned to one of the logical data streams 4-1 to 4-N. Data comprising invalid ingress destination data (i.e. destination data not associated with a logical data stream) may be discarded by the device 1.

In that case, data must be sent to the device 1 with valid ingress destination data in order to traverse the device 1 and reach its destination. This provides a first layer of security to the device as the received data must have been sent with valid ingress destination data.

The ingress destination data may comprise data identifying a logical port of a communication protocol. The protocol may be User Datagram Protocol (UDP), for example. The ingress destination data may further comprise data identifying the device 1, e.g. an IP address of the ingress network interface 2. However, other protocols may be used. Valid ingress destination data may identify a valid logical port number associated with a logical data stream 4-1 to 4-N. Assignment to a data stream may not depend on the IP address data.

Each logical data stream 4-1 to 4-N is also associated with egress destination data. The egress destination data is data identifying the destination of the output data on the egress side of the device 1. The egress destination data may be different from the ingress destination data.

The egress destination data may comprise data identifying a logical port of a communication protocol. The protocol may be User Datagram Protocol (UDP), for example. However, other protocols may be used. The egress destination data may further comprise an IP address of a destination system.

The security function performing part 5 is configured to remove the ingress destination data associated with the payload data and add the egress destination data, for each logical data stream 4-1 to 4-N. The egress destination data added depends on the logical data stream 4-1 to 4-N. In other words, a different destination data is added for each different data stream.

Accordingly, the logical data streams 4-1 to 4-N map ingress destination data to egress destination data. There is a mapping of ingress destination data to logical data stream 4-1 to 4-N and a mapping of logical data stream 4-1 to 4-N to egress destination data.

The received data may further comprise ingress source data identifying a source of the received data, e.g. an IP address and a source logical port for a system sending the data to the device 1. Likewise, the output data may comprise egress source data identifying a source of the output data. The egress source data may identify the device 1, e.g. by an IP address for the egress network interface 3, and a source logical port.

The security function performing part 5 may be further configured to remove the ingress source data associated with the payload data and add the egress source data, for each logical data stream. The egress source data added may depend on the logical data stream 4-1 to 4-N. For example, different source data may be added for each different data stream, e.g. different source logical port.

The adding of egress destination data and egress source may be performed using a look-up table, e.g. based on the unique stream identifier added to the data of each of the logical data streams 4-1 to 4-N. The unique stream identifier may be removed before the data is output at the egress network interface 3.

The removing and adding of destination and/or source data provides a protocol break providing a security function. The above functionality may be described below by reference to the protocol break.

Valid ingress destination data, i.e. that maps to a logical data stream 4-1 to 4-N, may be configurable by a user of the device 1, for each data stream 4-1 to 4N. Egress destination data and/or egress source data may also be configurable by the user of the device 1, for each data stream 4-1 to 4N. Accordingly, mapping of ingress destination data to egress destination data and/or egress source data may be configurable by a user of the device 1.

As shown in FIG. 1, the flow of data between the ingress network interface 2 and the egress network interface 3 is restricted so as to only occur in the direction from the ingress network interface 2 to the egress network interface 3.

This one way transfer function may be implemented by hardware, such as one way electrical connections between respective components that form the ingress network interface 2 and the egress network interface 3.

The security function performing part 5 may perform additional security functions.

The security function performing part 5 may perform a syntactic checking function which may be carried out at the datagram level. This may involve wrapping a data payload within a lightweight protocol layer to render the payload inert of "safe". If such syntax checking is used then the payload of each datagram must comply with a defined syntax (e.g. SISL) for it to be egressed without wrapping by the device 1. Non-compliant data will be encapsulated prior to egress to render it "safe".

Additional network-level security enforcing functions could be performed by the security function performing part 5, such as one or more of:

Data rate limits or alarms

Payload size limits

Source MAC/IP/UDP port filtering per input stream

Filtering of 'special' frame types such as broadcast frames

Verification of a payload "signature" such as a cryptographic hash

The additional security functions performed by security function performing part 5 may be configurable by a user. For example, additional security functions may be switched on and off by a user.

FIG. 2 schematically shows an example hardware implementation of the device 1. The device 1 may comprise one or more processing units 8. The processing units 8 may be field programmable gate arrays (FPGAs), for example.

As shown in FIG. 2, the device 1 may comprise first and second processing units 8-1 and 8-2 respectively implementing the ingress network interface 2 and the egress network interface 3. The first and second processing units 8-1 and 8-2 may also respectively implement the ingress network function performing part 6 and the egress networking function performing part 7.

As shown in FIG. 2, the device 1 may further comprise a third processing unit 8-3 for implementing at least some functions of the security function performing part 5 of the device 1, such as the protocol break and the additional security functions described above. The third processing unit 8-3 may be arranged downstream of the first processing unit 8-1 and upstream of the second processing unit 8-2, in the direction of unidirectional data transfer.

Some functions of the of the security function performing part 5 may be implemented by the processing units 8-1 and 8-2.

For example, part of the protocol break may be performed by the first and second processing units 8-1 and 8-2. The first processing unit 8-1 may remove source and/or destination data from the data received at the ingress network interface 2. The second processing unit 8-2 may add source and/or destination data to the data output at the egress network interface 3.

A one-way (e.g. electrical or optical) connection may be provided between each processing unit 8 to provide unidirectional data transfer. This may be provided in a conventional way for data diodes. For example, a single (unidirectional) differential signaling pair within a (normally multi-pair bidirectional) SerDes lane may be used. A buffer amplifier may be added in this unidirectional lane.

The processing units 8 may receive configuration data provided by a user, corresponding to functions performed by respective processing units 8. As described above, all user configurable parameters may be configured by the user through a management interface distinct from the ingress network interface 2 and the egress network interface 3. As shown in FIG. 2, by the arrows at the bottom, each of the processing units 8-1 to 8-3 may comprise a management interface distinct from the ingress network interface 2 (far left arrow) and the egress network interface 3 (far right arrow).

Valid ingress destination data (e.g. "open" logical ports) may be configured via the first processing unit 8-1. The ingress destination data for each logical data stream 4-1 to 4-N may be configured via the first processing unit 8-1. Assigning of the received data to a logical data stream may be performed by the first processing unit 8-1.

The egress destination data and/or egress source data for each logical data stream 4-1 to 4-N may be configured via the second processing unit 8-2. Alternatively, the above may be configured via one of the first to third processing units 8-1 to 8-3, e.g. the third processing unit 8-3.

Additional security functions may be configured via the third processing unit 8-3.

The device 1 may be implemented using 1G or 10G processing platforms, for example.

For a 10G platform, a single access point for configuration may be provided via the management interface of the platform.

For a 1G platform an access point for configuration may be provided via a serial console implemented on the first processor 8-1 or both the first and second processors 8-1, 8-2. Configurations may be stored in EEPROM. Physical access to the device may be required to change the configuration.

The device 1 described above may have an IP address so that traffic can be conventionally routed, e.g. over a SDN. Traffic from multiple sources can be multiplexed through a single device. The traffic between a source and destination can be routed across multiple devices, providing increased bandwidth or enabling resilient, redundant implementations. Traffic can be addressed and load balanced across multiple similar devices, providing scalability and flexibility for device deployment.

The disclosure describes a method whereby a hardware data diode may introduce a protocol break up to and including Layer-4 of the OSI stack, while also allowing routing of output traffic to multiple possible destinations depending on input data. This allows simple switching of output data to separate destination servers allowing greater parallelisation of output data and thus avoiding processing bottlenecks. For example, the output of the diode may be mapped to multiple destination virtual machines in a cloud environment.

Information from Layers 1-4 of the OSI stack are dropped at the data diode input and are recreated from scratch at the data diode output.

The information used for selecting the output destination is delivered to the data diode as information associated with the input packets or files. For example, routing information may be based on the destination port on which packet data is received by the diode It should be understood that the above describes examples for illustrative purposes only and the invention may otherwise be implemented without departing from the spirit or scope of the invention as defined by the appended claims.

Glossary of Terms

ARP—Address Resolution Protocol
DHCP—Dynamic Host Reconfiguration Protocol
EEPROM—Electrically Erasable Programmable Read Only Memory
FPGA—Field Programmable Gate Array
IP—Internet Protocol
MAC—Medium Access Control
NTP—Network Time Protocol
SEF—Security Enforcing Function
SISL—Simple Information Serialisation Language
UDP—User Datagram Protocol
1G—1 Gbit/s line rate
10G—10 Gbit/s line rate

The invention claimed is:

1. A method of data transfer, comprising:
receiving data at an ingress interface of a device, the received data comprising payload data and ingress destination data,
assigning received data to one of a plurality of logical data streams based on the ingress destination data,
the device removing the ingress destination data associated with the payload data and adding egress destination data to the payload data, for each logical data stream, wherein egress destination data added depends on the logical data stream,
outputting data at an egress interface of the device, the output data comprising the payload data and the egress destination data,
wherein data flow between the ingress interface and the egress interface of the device is unidirectional.

2. The method of claim 1, wherein assigning received data to one of a plurality of logical data streams based on the ingress destination data comprises adding a unique stream identifier to the received data.

3. The method of claim 1, wherein the correspondence between the ingress destination data and the logical data streams is configurable by a user.

4. The method of claim 1, wherein the correspondence between the logical data streams and the egress destination data is configurable by a user.

5. The method of claim 1, wherein ingress destination data that is valid and therefore assigned to a logical data stream is configurable by a user.

6. The method of claim 1, wherein the ingress destination data identifies an ingress logical port.

7. The method of claim 1, wherein the ingress destination data identifies the device.

8. The method of claim 1, wherein the egress destination data identifies a destination system.

9. The method of claim 1, wherein the egress destination data identifies a destination logical port.

10. The method of claim 1, wherein the user is able to configure the device via a management interface of the device distinct from the ingress interface and the egress interface.

11. The method of claim 1, wherein the device performs at least one further security function on each data stream before outputting the data at the egress interface.

12. The method of claim 1, wherein the at least one further security function is one or more of: syntactic checking, data rate limits or alarms, payload size limits, source MAC/IP/UDP port filtering, filtering based on data frame type, payload signature verification.

13. The method of claim 1, wherein the ingress interface is implemented by a first processing unit and the egress interface is implemented by a second processing unit, and wherein the assigning of received data to a logical data stream is performed by the first processing unit.

14. The method of claim 13, wherein the removal of the ingress destination data is performed by the first processing unit, the second processing unit or at least one further processing unit between the first and second processing units.

15. The method of claim 13, wherein the adding of the egress destination data is performed by the second processing unit.

16. The method of claim 13, wherein the at least one further security function is performed by a processing unit which does not implement the ingress or egress interfaces.

17. The method of claim 1, wherein the unidirectional data flow is implemented by a one way electrical connection within the device.

18. The method of claim 1, wherein the input and output data is UDP data.

19. A device for unidirectional data transfer, comprising:
an ingress interface for receiving data, the received data comprising payload data and ingress destination data,
an egress interface for outputting data, the output data comprising the payload data and egress destination data,
wherein the device is configured to:
assign the received data to one of a plurality of logical data streams based on the ingress destination data,
remove the ingress destination data associated with the payload data and add the egress destination data to the payload data, for each logical data stream, wherein egress destination data added depends on the logical data stream, and
allow data to flow between the ingress interface and the egress interface only from the ingress interface to the egress interface.

20. A network comprising at least one device according to claim 19.

* * * * *